United States Patent
Zeng et al.

(10) Patent No.: US 9,554,187 B2
(45) Date of Patent: Jan. 24, 2017

(54) SMART TELEVISION SYSTEM AND TURN-ON AND TURN-OFF METHOD THEREOF

(71) Applicant: MStar Semiconductor, Inc., Hsinchu Hsien (TW)

(72) Inventors: Fu-Shan Zeng, Chu Pei (TW); Meng Pu, Chu Pei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 14/601,304

(22) Filed: Jan. 21, 2015

(65) Prior Publication Data
US 2015/0208124 A1 Jul. 23, 2015

(30) Foreign Application Priority Data
Jan. 21, 2014 (CN) .......................... 2014 1 0028021

(51) Int. Cl.
*H04N 21/443* (2011.01)
*H04N 21/422* (2011.01)

(52) U.S. Cl.
CPC .... *H04N 21/4432* (2013.01); *H04N 21/42206* (2013.01); *H04N 21/4436* (2013.01)

(58) Field of Classification Search
None
See application file for complete search history.

(56) References Cited

U.S. PATENT DOCUMENTS

| | | | | |
|---|---|---|---|---|
| 4,907,150 A | * | 3/1990 | Arroyo | G06F 1/26 713/323 |
| 6,954,879 B1 | * | 10/2005 | Tobias | G01R 31/31853 710/8 |
| 2002/0038328 A1 | | 3/2002 | Morisawa | |
| 2004/0158853 A1 | * | 8/2004 | Doi | H04N 5/44543 725/38 |
| 2007/0234093 A1 | | 10/2007 | Kimura et al. | |

(Continued)

FOREIGN PATENT DOCUMENTS

| CN | 102577358 A | 7/2012 |
|---|---|---|
| CN | 103167255 A | 6/2013 |

OTHER PUBLICATIONS

SIPO Office Action, Jul. 27, 2016, 8 pages.
TIPO Office Action, May 26, 2016, 15 pages.

*Primary Examiner* — Nicholas Corbo
(74) *Attorney, Agent, or Firm* — Edell, Shapiro & Finnan, LLC (57) ABSTRACT

A smart television, and a turn-off method and a turn-on method for the smart television system are provided. The smart television system includes a remote controller and a smart television. The smart television includes a remote control module, a main chip, a memory chip and a memory chip. The turn-off method includes: when a remote control signal is received from the remote controller, quitting all operating interfaces of the television system; executing a television main program, which enters a wait status after completing loading a database and a program link process; storing a status of the main chip, and causing the memory chip to stay in a self-refresh operating mode; disconnecting power supplied to modules other than the remote control module and the memory chip, and the smart television system entering a turn off status.

6 Claims, 5 Drawing Sheets

(56) References Cited

U.S. PATENT DOCUMENTS

| | | | |
|---|---|---|---|
| 2009/0128447 A1* | 5/2009 | Yoshikawa | G06F 3/1431 345/1.1 |
| 2010/0138834 A1 | 6/2010 | Agarwal et al. | |
| 2011/0040959 A1 | 2/2011 | Choi et al. | |

* cited by examiner

FIG. 9

SMART TELEVISION SYSTEM AND TURN-ON AND TURN-OFF METHOD THEREOF

This application claims the benefit of People's Republic of China application Serial No. 201410028021.4, filed Jan. 21, 2014, the subject matter of which is incorporated herein by reference.

BACKGROUND OF THE INVENTION

Field of the Invention

The invention relates in general to a smart television technology, and more particularly, to a smart television system and a turn-on and turn off method thereof.

Description of the Related Art

Figure 1:
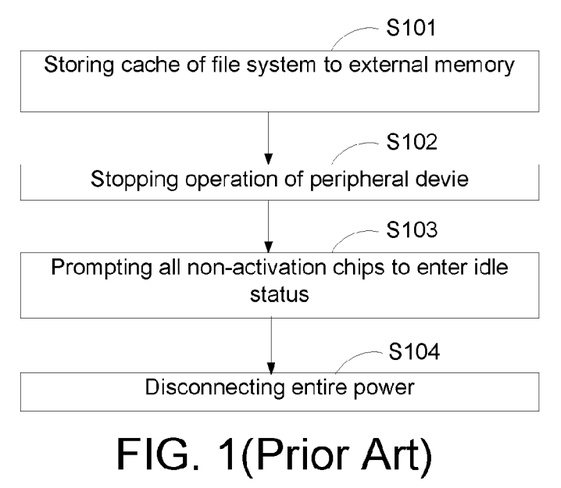
FIG. 1 is a flowchart of a conventional method for turning off a smart television system.

As shown in FIG. 1, a conventional method for turning off a smart television system includes following steps.

In step S101, a cache of a file system is stored to an external memory.

In step S102, operations of peripheral devices are stopped.

In step S103, all non-activation chips prompted to enter an idle status. A non-activating chip refers to a chip other than a memory chip.

In step S104, the entire power is disconnected.

In a conventional smart television system, the power of the television main chip and the power of peripheral devices are simply disconnected when a power key on a remote controller is pressed, and statuses of the main chip and the peripheral devices are not stored. In a standby function built-in an Android operating system, instead of being completely disconnected from the power, the main chip and the peripheral devices are caused to enter a low power consumption state. Further, while playing the background music, as the wake lock is locked, the system only shuts down the screen and does not achieve a standby mode.

Figure 2:
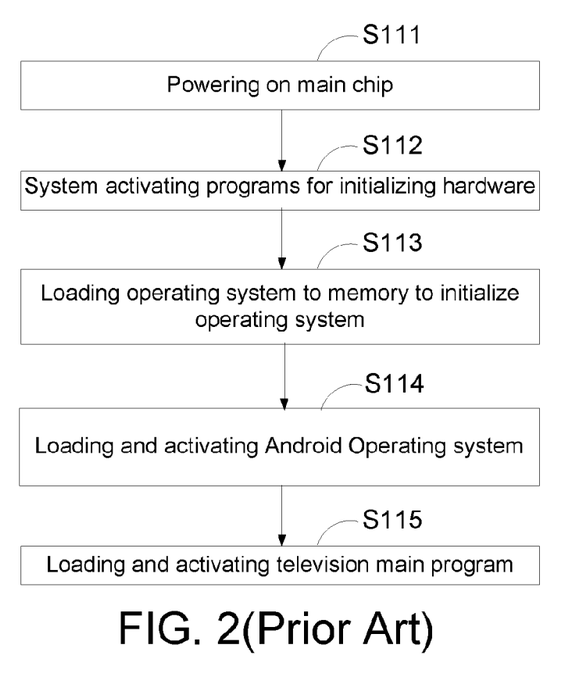
FIG. 2 is a flowchart of a conventional method for turning on a smart television system.

When the power key on the remote controller is again pressed to power on the smart television system, the power on method includes steps shown in FIG. 2.

In step S111, the main chip is powered on.

In step S112, the system activates programs for initializing hardware.

In step S113, the operating system is loaded to the memory to initialize the operating system.

In step 114, the Android operating system is loaded and activated.

In step S115, the television main program is loaded and activated.

It can be seen from the above that, in the power-on process, the system needs to be reloaded and initialized, the television main program needs to be loaded and the dynamic program link of the database need to be performed. Such process is extremely time-consuming, and provides a slow power-on speed that yields unsatisfactory user experiences.

Therefore, there is a need for a smart television system and a turn-on and turn off method thereof for solving the above issues.

SUMMARY OF THE INVENTION

The present invention is directed to a smart television system, and a turn-on method and a turn-off method for the smart television system. With the present invention, the time for required for reloading and initializing the smart television system as well as loading a television main program and a completing program link process of a database can be saved, thereby significantly increasing a turn-on speed and simultaneously enhancing user experiences.

A turn-off method for a smart television system is provided according to an embodiment of the present invention. The smart television system includes a remote controller, and a smart television. The smart television includes a remote control module, a main chip, and a memory chip. The turn-off method includes: when a remote control signal is received from the remote controller, quitting all operating interfaces of the smart television; executing a television main program, the television main program entering a wait status after completing loading a database and a program link process; storing status of the main chip, and causing the memory chip to stay in a self-refresh operating mode; and disconnecting power supplied to modules other than the remote control module and the memory chip, the smart television system entering a turn-off status.

A turn-on method for a smart television system is further provided according to an embodiment of the present invention. The smart television includes a remote control module, a main chip, and a memory chip comprising a processor. The remote control module receives key information from the remote controller. The turn-on method includes: the remote controller restoring power supplied to the main chip after receiving the key information, the main chip executing an activation program of the smart television system to cause the memory chip to return from a self-refresh operating mode to a normal operating mode; restoring status of the main chip prior to being turned off from the memory chip; and restoring a normal operation of a television main program to complete a turn-on process.

A smart television system is further provided according to an embodiment of the present invention. The smart television system includes a remote controller, and a smart television. The smart television includes a remote control module, a main chip, a memory chip comprising a processor. The remote control module receives key information from the remote controller. When the key information is a turn-off signal, the processor quits operating interfaces of the smart television system, and executes a television main program, which enters a wait status after completing loading a database and a program link process. The processor further stores status of the main chip, causes the memory chip to stay in a self-refresh operating mode, and disconnects power supplied to modules other than the remote control module and the memory chip, so that the smart television system enters a turn-off status. When the key information is a turn-on signal, the processor restores the power supplied to the main chip, which then executes an activation program of the smart television system to cause the memory chip to restore from the self-refresh operating mode to a normal operating mode. Further, the main chip is restored to status prior to being turned off, and the processor further restores a normal operation of the television main program to complete a turn-on process.

In the present invention, when a power key on a remote controller is pressed to initiate a turn-off process and all operating interfaces are forcibly quitted, a television main program is executed to complete loading a database and a program link process, and statuses of a peripheral device and a main chip are stored. Meanwhile, a memory chip is caused to stay in a self-refresh operating mode. As such, when the smart television system is turned on next time, the time for reloading and initializing the smart television system as well as loading a television main program and completing a program link process of a database can be saved, thereby significantly increasing a turn-on speed and simultaneously enhancing user experiences.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 3:
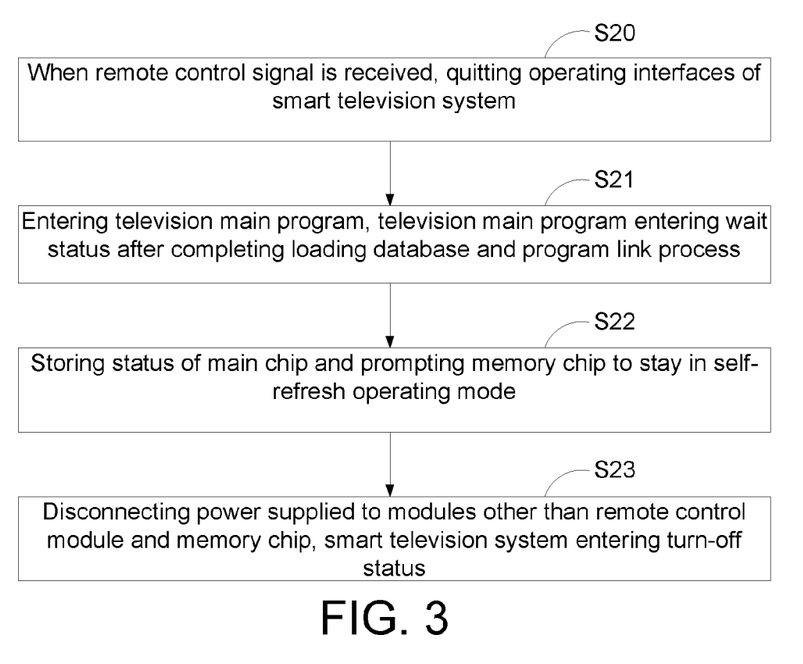
FIG. 3 is a flowchart of a method for turning off a smart television system according to an embodiment of the present invention.

FIG. 3 shows a schematic diagram of a method for turning off a smart television system according to an embodiment of the present invention. Referring to FIG. 3, a method for turning off a smart television system according to an embodiment of the present invention includes following steps.

In step S20, when a remote control signal from the remote controller is received, all operating systems of the smart television system are quitted.

In the embodiment of the present invention, the smart television system adopts an Android operating system. When a user presses a power key on a remote controller, the smart television system automatically retrieves a process corresponding to the power key on the remote controller from a frame of the Android operating system and overwrites a default process by the retrieved process. The power key on the remote controller later causes the smart television system to return to a login interface via predetermined process functions, and also causes all activities to stay in a suspend or stop status.

In step S21, a television main program is executed, and the television main program enters a wait status after completing loading a database and a program link process.

The television main program is immediately executed after all the activities of the smart television system are quitted, and the loading and the dynamic link process of the database are completed, so as to save the time needed for loading the main television program and the dynamic link process of the database the next time the smart television system is turned on.

In step S22, a status of a main chip is stored, and a memory chip is caused to stay in a self-refresh operating mode.

After the television main program enters the wait status, the operating system of the smart television stores the operating status of and a context of the main chip, and the memory chip is simultaneously caused to stay in a self-refresh operating mode. It should be noted that, under the self-refresh operating mode, as long as the memory chip is powered, it can be ensured that data stored in the memory chip does not get lost and can be directly accessed in a next turn-on process, thereby eliminating the reloading and initialization processes of the smart television system. The main chip controls normal operations of the operating system of the smart television. The memory chip stores the operating status of the operating system of the smart television, so as to allow the smart television system to quickly restore to a status prior to being turned off. In an embodiment, the smart television system further comprises a peripheral device, e.g., a USB key, a STB or a portable device, the memory chip stores the operating status of the peripheral devices, so that the peripheral device is restored to a status prior to being turned off.

In step S23, power supplied to modules other than the remote control module and the memory chip is disconnected, and the smart television system enters a turn-off status.

Figure 4:
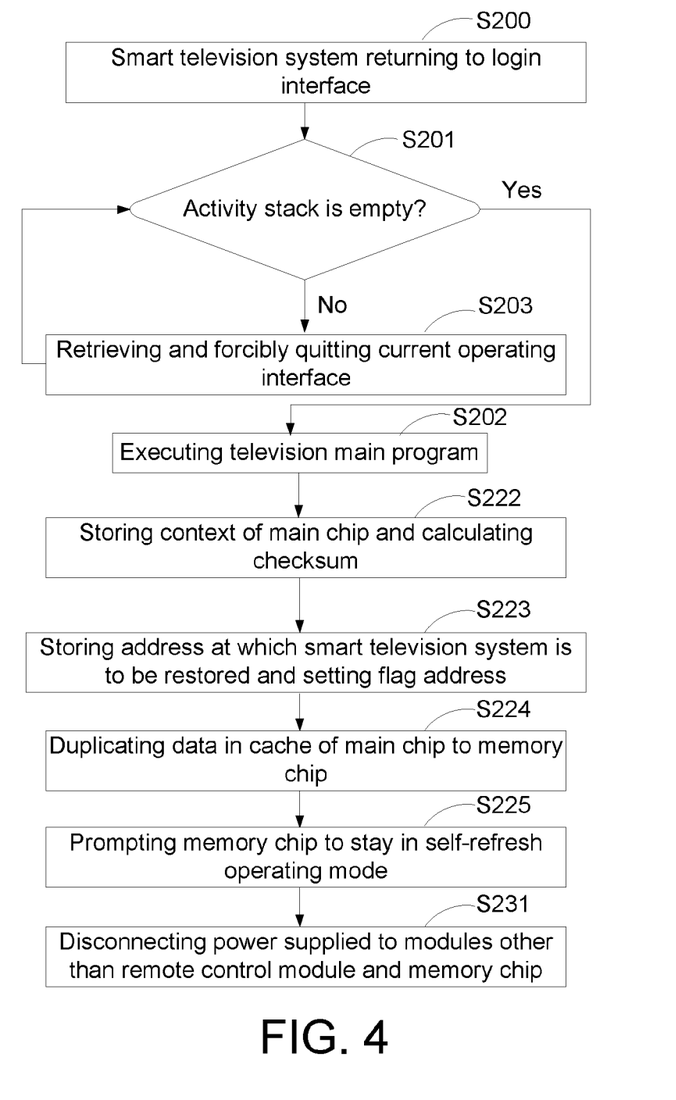
FIG. 4 is a flowchart of a method for turning off a smart television system according to an embodiment of the present invention.

FIG. 4 shows a flowchart of a method for turning off a smart television system according to an embodiment of the present invention. In step S20 shown in FIG. 3, when the user presses the power key on the remote controller, i.e., when the remote control module of the smart television system receives the remote control signal from the remote controller, a processing function of the power key on the remote controller first prompts the smart television system to return to the login interface. At this point, all activities are suspended. Referring to FIG. 4, step S20 includes following steps.

In step S200, the smart television system returns to the login interface.

In step S201, it is determined whether an activity stack is empty. Step S202 is performed if the activity stack is empty, or else step S203 is performed if not.

In step S202, the television main program is executed.

In step S203, the current operating interface is retrieved and forcibly quitted, and the process returns to step S201.

Figure 5:
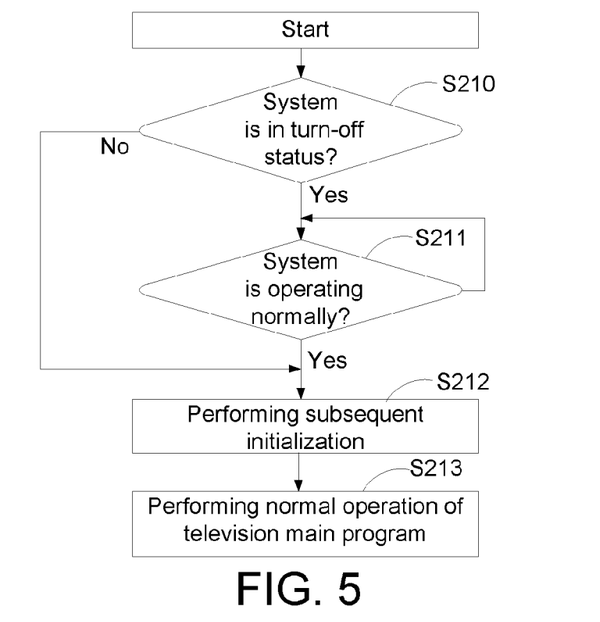
FIG. 5 is a flowchart of a television main program a smart television system having entered a wait status according to an embodiment of the present invention.

In step S21 in FIG. 3, the television main program having entered the wait status continually detects whether the smart television system is operating normally, and stays in the wait status to prevent subsequent operations from being operated too early. As shown in FIG. 5, step S21 includes following steps.

In step S210, it is determined whether the smart television system is in the turn-off status. Step S211 is performed if so, or else step S212 is performed if not.

In step S211, it is determined whether the smart television system is operating normally. Step S212 is performed if the smart television system is operating normally, or else step S211 is iterated if not.

In step S212, a subsequent initialization process is performed.

In step S213, the process of the television main program is normally executed.

In step S22 in FIG. 3, the operating system stores the status of the main chip. As shown in FIG. 4, step S22 includes following steps.

In step S222, the context of the main chip is stored, and a checksum is calculated.

In step S223, an address at which the smart television system is to be restored is stored, and a flag address is set. Thus, in a next turn-on process, the smart television system can be restored according to the stored address.

In step S224, data in a cache of the main chip is duplicated to a memory.

In step S225, the memory chip is caused to operate in the self-refresh operating mode. When the memory chip is powered, it is ensured that the data stored in the memory chip is not lost.

In step S231, power supplied to modules other than the remote control module and the memory chip module is disconnected.

At this point, in the entire smart television system, only a small amount of power is supplied to the remote control module and the memory chip module. The power supplied to the remote control module is to allow the remote control module to receive the key information from the remote controller. The power supplied to the memory chip is to store necessary data for restoring the status of main chip as quickly as possible in a next turn-on process in order to reduce the time need for turning on the smart television system.

In the embodiment, by storing the operating status of the main chip while the smart television system is turned off, when the smart television system is turned on next time, the time for reloading and initializing the smart television system as well as loading the television main program and completing the dynamic link process of the database can be saved, thereby significantly increasing the turn-on speed and simultaneously enhancing user experiences.

Figure 6:
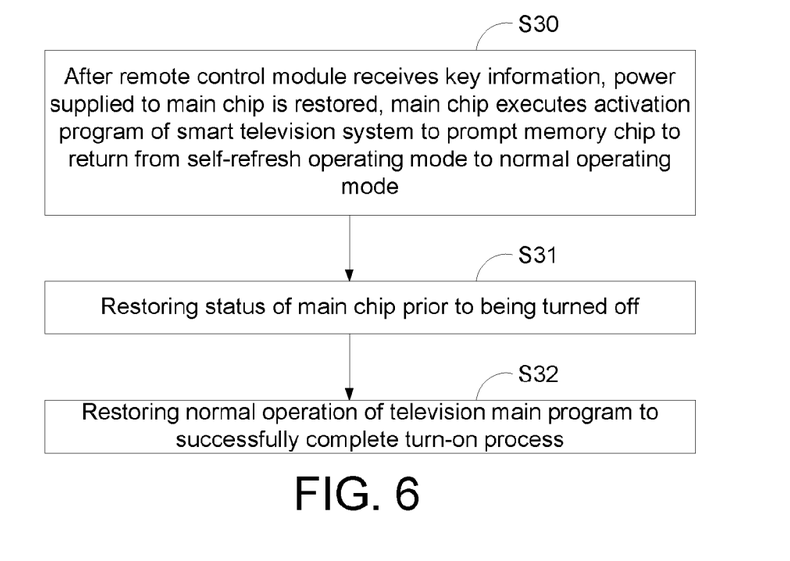
FIG. 6 is a flowchart of a method for turning on a smart television system according to an embodiment of the present invention.

FIG. 6 shows a flowchart of a method for turning on a smart television system according to an embodiment of the present invention. As shown in FIG. 6, the method for turning on a smart television system according to the embodiment of the present invention includes following steps.

In step S30, after the remote control module receives a remote control signal from the remote controller, the power supplied to the main chip is restored. The main chip then executes an activation program of the smart television system to cause the memory chip to return from the self-refresh mode to the normal operating mode. Next, the smart television system executes some fundamental initialization processes.

Figure 7:
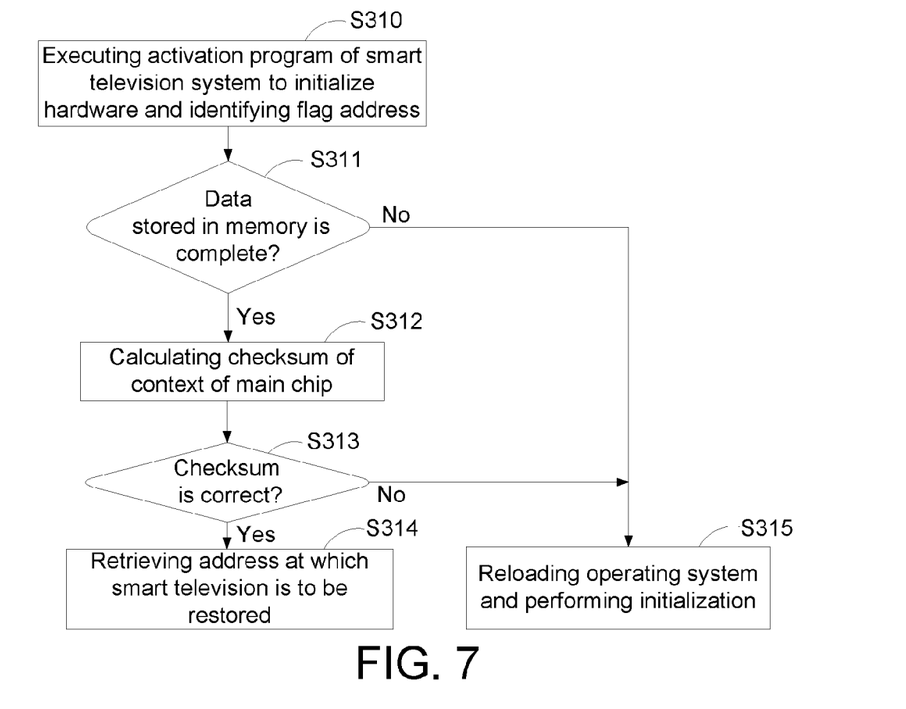
FIG. 7 is a flowchart of restoring a main chip and all peripheral devices in a smart television system to statuses prior to being turned off according to an embodiment of the present invention.

In step S31, status of the main chip prior to turning off the smart television system is restored. As shown in FIG. 7, the smart television system first executes the activation program to restore the context of the main chip, and restores the statuses prior to the turning off process from the memory chip. More specifically, step S31 includes following steps.

In step S310, the activation program of the smart television system is executed to initialize hardware, and the flag address is identified.

In step S311, it is determined whether the data stored in the memory is complete. Step S312 is performed if so, or else step S315 is performed if not.

In step S312, a checksum of the context of the main chip is calculated.

In step S313, it is determined whether the checksum is correct. Step S314 is performed if the checksum is correct, or else step S315 is performed if not.

In step S314, the address at which the smart television system is to be restored is retrieved to restore the statuses of all the peripheral devices prior to last turning off the smart television system.

In step S315, the operating system is reloaded and the initialization process is performed. Thus, the time need for reloading and initializing the system is eliminated to reduce the turn-on time and to increase the turn-on speed.

In step S32, the television main program is restored to normal operations, thus completing the turn-on process. After the television main program is restored, the television main program enters a wait status. The flag address previously set is for indicating that the television main program has restored to normal operations. When the television main program checks the flag address and discovers that the smart television system is operating normally, the television main program exits the wait status and continues subsequent operations of the television main program. The smart television system is successfully turned on.

In the embodiment, by storing the operating status of the main chip while the smart television system is turned off, when the smart television system is turned on next time, the time for reloading and initializing the smart television system as well as loading the television main program and completing the dynamic link process of the database can be saved, thereby significantly increasing the turn-on speed and simultaneously enhancing user experiences.

Figure 8:
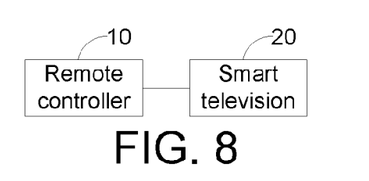
FIG. 8 is a block diagram of a smart television system according to an embodiment of the present invention.
Figure 9:
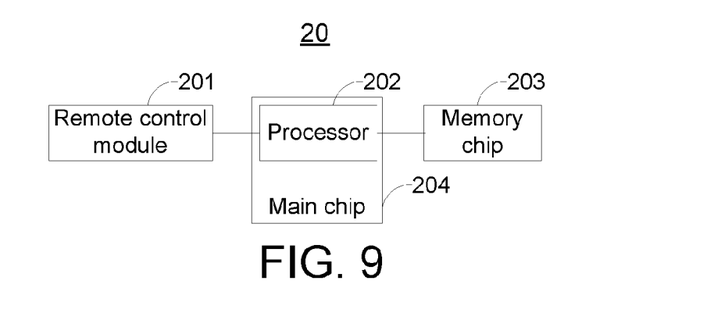
FIG. 9 is a smart television in a smart television system according to an embodiment of the present invention.

FIG. 8 shows a block diagram of a smart television system according to an embodiment of the present invention. As shown in FIG. 8, the smart television system according to the embodiment of the present invention includes a remote controller 10, and a smart television 20. The smart television 20 is connected to a remote control module 201 and the peripheral device 30. The remote control module 201 receives key information from the remote controller 10. As shown in FIG. 9, the smart television 20 includes a remote control module 201, a main chip 204, a memory chip 203, and the main chip 204 comprises a processor 202. The processor 202 is electrically connected to the remote controller 201, the main chip 204 and the memory chip 203.

In the embodiment, the key information includes a turn-off signal and a turn-on signal. When the key information that the remote control module 201 receives is a turn-off signal, a processing function of a power key on the remote controller predetermined in the processor 20 first prompts the smart television system to return to a login interface, and the processor 202 quits all operating interfaces of the smart television system. At this point, the processor 202 determines whether an activity stack is empty, and executes a television main program if the activity stack is empty. If the activity stack is not empty, the current operating interface is retrieved and forcibly quitted, and the processor 202 then again determines whether the activity stack is empty.

Next, the processor 202 executes the television main program, and enters a wait status after the television main program completes loading a database and a program link process. The processor 202 stores status of and the main chip 204, and causes the memory chip 203 to stay in a self-refresh operating mode. In an embodiment, the smart television system further comprises a peripheral device, e.g., a USB key, a STB or a portable device, the processor 202 stores the operating status of the peripheral devices, so that the peripheral device is restored to a status prior to being turned off. The operating system of the processor 202 further stores a context of the main chip 204, calculates a checksum, stores an address at which the smart television system is to be restored, and sets a flag address for indicating the address at which the smart television system is to be restored in a next turn-on process. The data in the cache of the main chip 204 is duplicated to the memory chip 203. The processor 202 changes the operating mode of the memory chip 203 to the self-refresh operating mode. Thus, given that power is supplied to the memory chip 203, it can be ensured that the data stored in the memory chip 203 is not lost. The processor 202 then disconnects the power supplied to modules other than the remote control module 201 and the memory chip 203, and the smart television system enters a turn-off state.

In the embodiment, after the television main program enters the wait status, the processor 202 determines whether the smart television system is in a turn-off state. If the smart television system is not in a turn-off state, a subsequent initialization process is performed to normally execute the television main program; if so, the processor 202 determines whether the smart television system is operating normally. If the smart television system is operating normally, the subsequent initialization is performed to normally execute the television main program; if not, the step in which the processor 202 determines whether the smart television system is operating normally is iterated.

In the embodiment, when the key information is a turn-on signal, the processor 202 restores the power supplied to the main chip 204. The main chip 204 executes an activation program of the smart television system to initialize hardware, and identifies the flag address to determine whether the data stored in the memory chip 203 is complete. If the stored data is incomplete, the processor 202 reloads the operating system and performs initialization. If the stored data is complete, the processor 202 calculates a checksum of the context of the main chip 204. The processor 202 determines whether the checksum is correct. If the checksum is correct, the address at which the smart television system is to be restored is retrieved to restore the status prior to turning off the smart television system. Next, the processor 202 causes the memory chip 203 to return from the self-refresh mode to a normal operating mode, and the main chip 204 is restored to status prior to being turned off. The processor 202 restores the television main program and causes the television main program to enter a wait status, and sets the flag address to indicate that the television main program has restored to normal operations. When the television main program identifies the flag address and discovers that the smart television is operating normally, the television main program exits the wait status. Subsequent operations of the television main program are performed, and the smart television system is successfully turned on. In the embodiment, when the smart television system receives a turn-off signal, the loading and the dynamic program link process of the television main program are completed, and the statuses of the peripheral device and the main chip 204 are stored. Thus, in a next turn-on process, the status of the main chip 204 prior to the being turned off can be restored to quickly complete the activation, thereby saving the time for reloading and initializing the smart television system as well as loading the television main program and completing the program link process of the database, and significantly increasing a turn-on speed.

In conclusion, while the power key on the remote controller is pressed and all operating interfaces are quitted, the television main program is executed to complete the loading of the database and the program link process, and the status the main chip is stored. Meanwhile, the memory chip is caused to stay in the self-refresh operating mode. Therefore, in a next turn-on process, the time required for reloading and initializing the smart television system as well as the loading of the television main program and the dynamic link process of the database can be saved, thereby significantly increasing the turn-on speed and enhancing user experiences.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A turn-off method for a smart television system, the smart television system comprising a remote controller, and a smart television, the smart television comprising a remote control module, a main chip, and a memory chip; the turn-off method comprising:
   when receiving a remote control signal from the remote controller, quitting operating interfaces of the smart television;
   executing a television main program to load a database and perform a program link process of the database;
   storing a context of the main chip to the memory chip, and calculating a checksum of the stored context;
   storing an address at which the smart television is to be stored when the checksum of the stored context is correct, and setting a flag address to indicate the smart television can be restored in a next turn-on process;
   causing the memory chip to stay in a self-refresh operating mode; and
   disconnecting power supplied to modules other than the remote control module and the memory chip to cause the smart television to enter a turn-off status.

2. The turn-off method according to claim 1, wherein the step of quitting the operating interfaces of the smart television comprises:
   determining whether an activity stack is empty;
   executing the television main program when the activity stack is empty; and
   retrieving and forcibly quitting the current operating interface when the activity stack is not empty,
   wherein, when the remote control module of the smart television system receives the remote control signal from the remote controller, the smart television system returns to the login interface and all activities are suspended.

3. The turn-off method according to claim 1, wherein the step of executing the television main program further comprises:
   determining whether the smart television is in a turn-off status;
   when the smart television is not in the turn-off status, executing a subsequent initialization to normally execute the television main program; and
   when the smart television is in the turn-off status, determining whether the smart television is normally operating, performing the subsequent initialization when the smart television system is normally operating to normally execute the television main program, and returning to the step of determining whether the smart television system is normally operating when the smart television system is not normally operating.

4. The turn-off method according to claim 1, the smart television system further comprising a peripheral device, the method further comprising:
   storing status of the peripheral device into the memory chip.

5. A turn-on method for a smart television system, the smart television system comprising a remote controller, and a smart television, the smart television comprising a remote control module, a main chip, and a memory chip; the turn-on method comprising:
- restoring power supplied to the main chip after the remote control module receives a remote control signal from the remote controller, the main chip executing an activation program of the smart television to cause the memory chip to return from a self-refresh operating mode to a normal operating mode;
- identifying a flag address to indicate the smart television can be restored;
- calculating a checksum of a context of a main chip;
- retrieving the address at which the smart television is to be restored to restore the status of the main chip when the checksum is correct; and
- restoring normal operations of a television main program to complete a turn-on process.

6. The turn-on method according to claim 4, wherein the step of restoring the normal operations of the television main program comprises:
- restoring the television main program and entering a wait status, and setting the flag address to indicate that the television main program has restored to normal operations;
- the television main program exiting the wait status when the flag address is identified and the smart television system is determined as operating normally; and
- continuing subsequent operations of the television main program to successfully complete a turn-on process of the smart television system.

* * * * *